Oct. 18, 1938.   G. D. KRATZ   2,133,821
METHOD OF AND NEW AND IMPROVED MECHANISM FOR PRODUCING THREAD
Filed Oct. 22, 1934
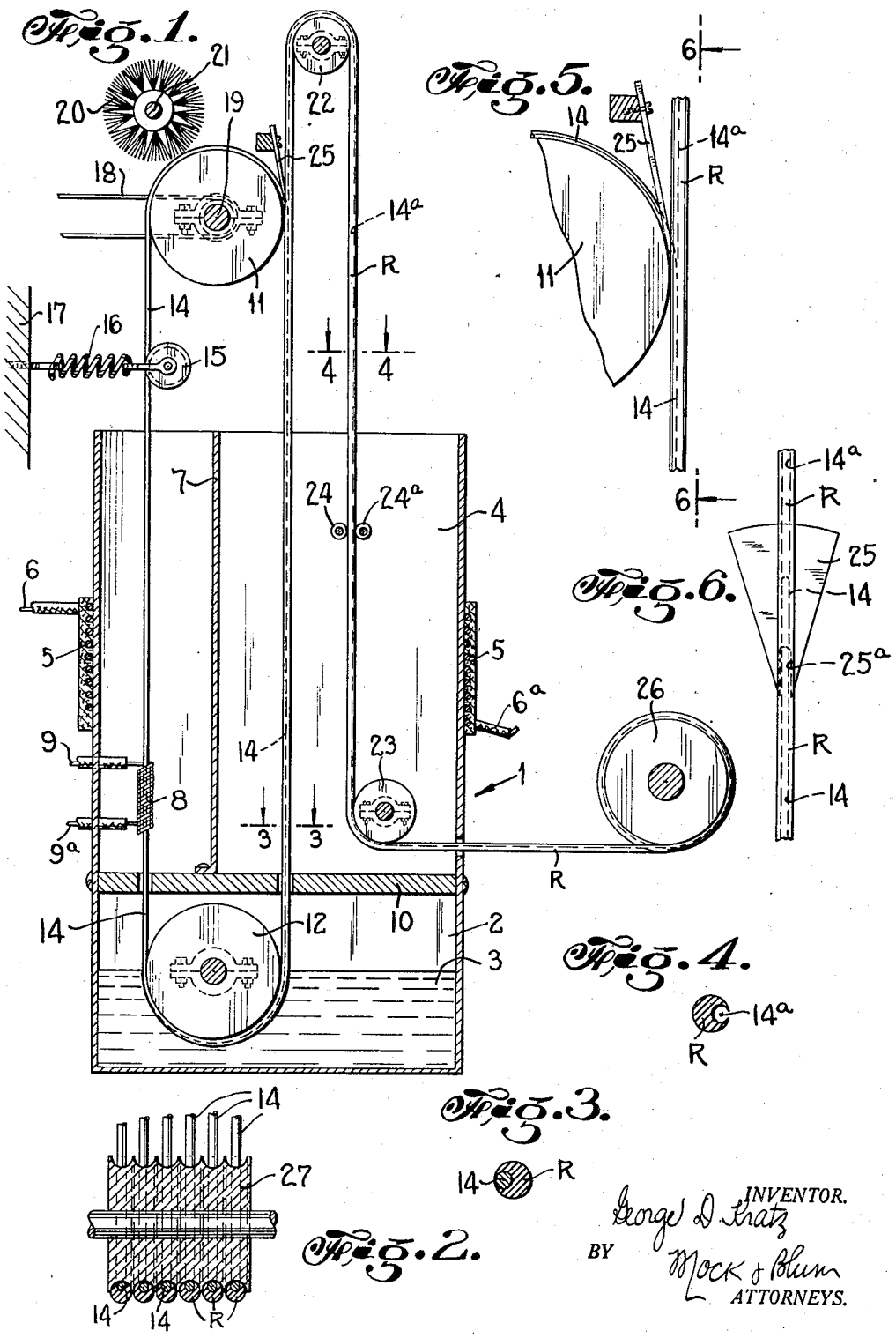

Patented Oct. 18, 1938

2,133,821

UNITED STATES PATENT OFFICE 2,133,821

METHOD OF AND NEW AND IMPROVED MECHANISM FOR PRODUCING THREAD

George D. Kratz, Scarsdale, N. Y., assignor, by mesne assignments, to Filatex Corporation, New York, N. Y., a corporation of New Jersey Application October 22, 1934, Serial No. 749,497

6 Claims. (Cl. 18—8)

My invention relates to a new and improved method of, and a new and improved mechanism for, producing rubber thread.

One of the objects of my invention is to provide a method and apparatus whereby rubber thread can be produced cheaply and quickly, said rubber thread being of the type which can be covered with one or more helical windings of any suitable yarn, such as silk or cotton or the like.

Another object of my invention is to provide a mechanism and a method whereby a heated member is moved in a pool of latex or other suitable rubber dispersion, so that the heated member collects a surface layer of partially or wholly dried latex of suitable thickness.

Another object of my invention is to provide a method whereby the latex can be provided with any suitable vulcanizing ingredient or ingredients, including accelerators and fillers, so that the latex which is withdrawn from the pool thereof, can be subsequently heated in order to partially or completely vulcanize the latex.

While my invention relates particularly to the use of latex, I can use any suitable rubber dispersion, and the invention is not limited to the use of natural rubber as it also applies to artificial or substitute rubber.

Other objects of my invention will be set forth in the following description and drawing which illustrates a preferred embodiment thereof, it being understood that the above general statement of the objects of my invention is intended generally to explain the same, without limiting it in any manner.

Fig. 1 is a side elevation, partially in section, of one type of apparatus which can be used for carrying out the improved method. It is to be understood that the illustration is wholly diagrammatic.

Fig. 2 is a detail sectional view showing a modification of the roller or pulley which is shown in Fig. 1.

Fig. 3 is a sectional view through the line 3—3 of Fig. 1.

Fig. 4 is a sectional view through the line 4—4 of Fig. 1.

Fig. 5 is a detail view, showing how the rubber thread is stripped from the collecting member.

Fig. 6 is an elevational view taken along the line 6—6 of Fig. 5.

As shown in Fig. 1, a container 1 is provided, having its wall made of any suitable metal or other material. Said container 1 is divided by a partition 10, into a lower compartment or chamber 2, and an upper compartment or chamber 4. A pool of latex 3 is located within the chamber 2, and said pool of latex may be kept at constant level, if desired, by any suitable device. Ordinarily it is not necessary to keep said pool of latex 3 at constant level, and suitable quantities of latex can be added thereto, as latex is removed therefrom. Said pool of latex 3 is ordinarily stationary, although it may be gently or vigorously circulated or agitated, if desired.

The upper chamber 4 is heated in any suitable manner. For example, I have shown a conventional heating coil 5, to which electric current is supplied by means of leads 6 and 6a. However I can use any suitable heating system for heating said upper chamber 4.

Said upper chamber 4 is preferably provided with a partition 7, which divides the same into two parts.

An endless wire 14, made of any suitable metal or any other material, passes around an upper pulley 11 and a lower pulley 12. Said wire 14 is maintained taut by means of an idler pulley 15, which is mounted so that it can turn upon a suitable shaft. A tension spring or springs 16 are connected to the shaft of the idler 15, and to a fixed abutment 17, so that the endless member 14 is maintained under suitable tension.

If desired, the wire 14 could be directly heated by any suitable means, in addition to the indirect heat which is provided by the heating element 5. For example the member 14 may pass through a heating coil 8, said heating coil 8 being supplied with electric current through leads 9 and 9a. Said heating coil 8 is of any suitable type, and it can be made of any desired height, so that if desired, the temperature of the left-hand or entering run of member 14 may be higher than the temperature within the chamber 4. Said flexible member 14 may be a wire, or band or belt, of any material and of any shape.

Likewise, and if desired, the heating element 5 could be located within the chamber 4, or it may be located wholly in the sub-chamber which is located at the right hand side of the vertical partition 7, especially if heating member 8 is utilized.

The shaft 19 of the upper pulley 11 is driven by means of a belt 18, which passes around a suitable pulley which is provided upon said shaft 19. As shown in Fig. 1, the wire 14 passes through suitable openings which are provided in the horizontal partition 10.

As the heated member 14 dips into the pool 3, it collects latex at the exterior thereof. The movement of the member 14 is sufficiently slow, so that a film or layer of rubber, of any desired thickness, can be collected upon the exterior of the wire 14, as the lower part of said wire 14 passes through the pool of latex. Said film may be very thin, so that the covered rubber thread may be used directly in the needles of a knitting machine, in order to knit girdles, stockings, and elastic fabrics of any type.

The shape of the collected layer of rubber R in this embodiment is shown in Fig. 3. In this particular embodiment, I prefer to make the cross-section of the wire 14 circular, and I therefore collect a rubber thread R whose exterior is substantially circular in cross-section.

The collected film or layer of rubber R is sufficiently coherent to adhere to the wire 14, in the desired shape, as the right-hand or outlet run of wire 14 passes through the partition 10. The collected film of latex is then additionally heated in the upper chamber 4, so that the latex is fully dried before it is acted upon by the stripper 25. Said latex may also be partially or wholly vulcanized, before being stripped. The film of latex can be heated directly by a heating coil similar to coil 8, through which the coated outlet run of member 14 passes. Of course, a coil of pipe can be used instead of an electrically heated coil, said coil of pipe being heated by steam or any suitable gas or vapor. If a coil of pipe is thus used to heat the latex on the right-hand run of wire 14, said coil may be of any desired height.

This stripper 25 is made of any suitable metal or other material, and it is preferably made of resilient metal. The upper end of the stripper 25 is suitably connected to any fixed member. The lower end of the stripper 25 has a longitudinal recess 25a, so that the lower end of said stripper 25 is forked, so that it can straddle the adjacent part of the wire 14.

When the rubber thread R has been stripped from the wire 14, it has the shape shown in Fig. 4, in this embodiment. The rubber thread R thus has a longitudinal recess 14a, which corresponds to the shape of the wire 14.

The rubber thread is now sufficiently coherent (and partially vulcanized, if desired) so that it can pass over a guide pulley 22, which may be an idler, or which may be driven positively at the same speed as the speed of movement of the rubber thread R. The rubber thread R now passes through the heating chamber 4, where it is additionally heated. If desired, the vulcanization of the rubber thread can be completed as it moves downwardly through said heating chamber 4. Likewise, and if desired, pressure rollers 24 and 24a which can be driven in unison by any suitable means, can be provided for consolidating the rubber thread R, before said rubber thread R is finally vulcanized by its final passage through the heating chamber 4. If the rubber thread R is thus finally vulcanized, the longitudinal recess 14a in said rubber thread may be eliminated prior to complete vulcanization, by the use of the pressure rolls 24a and 24. Any suitable number of pairs of said pressure rolls may be provided, so that the rubber thread can be shaped into any desired form, before it is finally vulcanized. The rubber is sufficiently plastic and tacky, as it is acted upon by said rolls, so that the rubber thread can be given any desired shade, prior to complete vulcanization.

However, I prefer to leave the longitudinal recess 14a in the rubber thread R, as such recess increases the elasticity of said rubber thread.

The rubber thread R now passes around another guide pulley 23, which may be an idler, or which may be driven positively at the same speed of movement as the speed of movement of the rubber thread R. The rubber thread can then be passed through an opening in the wall of tank 1 directly to the covering machine or machines, where it is covered with one or more helical layers of yarn in the well-known manner. If desired, the uncovered rubber thread can be taken up upon the magazine roller 26, which may be driven by any suitable means.

In the embodiment shown in Fig. 2, the rollers 15 or pulleys 11 and 12 are replaced by rollers or pulleys 27. Said rollers or pulleys 27 are provided with grooves, in each of which an endless wire or belt or band 14 is located. The device shown in Fig. 2 therefore makes it possible to pass any desired number of flexible members through the latex, thus increasing the production.

The rollers or pulleys 11, 12 and 27 can be made of metal, or they can be made of any suitable material which does not conduct electricity, and which is a poor conductor of heat. If desired, each of the grooves of each pulley 27 can be provided with a metal sheath or lining, said linings being separate from each other. The object of providing such metal linings is to diminish the wear upon the pulleys 27, since the wires 14 may be under considerable tension.

I have shown a preferred embodiment of my invention and a modification thereof, but it is clear that numerous other changes and modifications could be made without departing from its spirit.

For example, I can provide a brush 20, which is mounted upon any suitable driven shaft 21, so that said brush 20 is turned in a direction which is opposite to the direction in which the pulley 11 is turned. Said brush removes any latex which may adhere to the wire or to the upper pulley 11. If desired, the brush 20 and the upper pulley 11 may be turned in the same direction.

The member 14 may be described generally as a belt member, without restricting it to any particular metallic or non-metallic material.

Likewise, I do not wish to be limited to a device or method in which belt member 14 is maintained under tension, and in some cases it would not be necessary to have a lower pulley which dips into the bath of latex. The belt member could be pressed against the surface of the upper roller 11 by any suitable roller means, so that the turning of said upper roller would be sufficient to move the belt member through its closed path of movement. The sleeve-like rubber thread which would thus be formed could be slitted and stripped from the belt member, so that two rubber threads would be formed, each thread having substantially the shape shown herein.

The rubber thread may be dusted with any suitable powder, in order to render it nonadherent, before it is wound upon roll 26. It may have a thickness as low as 0.008 inch or even thinner. The member 14 may be made of "Monel" type, stainless steel, or of other material which is not attacked by the ammonia or other ingredients which are present in commercial latex.

These preferred materials are characterized by being substantially impermeable to the latex or other rubber dispersion, so that the latex is collected upon said member 14 by means of the original surface adhesion of the latex to the material of said member 14 and by the subsequent surface adhesion of the latex to the previously formed layer of latex which has been collected by the heated member 14.

It is desirable to avoid heating the latex save at the point where it contacts with the heated member 14. For this reason the wall of the tank 1 can be made of any suitable material which is a poor conductor of heat and the partition 10 can also be made of such material. In such case the heating coil 5 can be located within the chamber 4.

Likewise the heating chamber 4 can be separated from the tank in which the latex is located, and any suitable heat insulating means or system can be employed for maintaining the pool of latex at a suitable low temperature so that it will not coagulate, save at the point where it contacts with the member 14.

If desired any suitable means could be used for refrigerating the latex, in order to prevent the same from being overheated, so that it will not coagulate save where it is collected by the member 14.

While I have shown an endless collecting member 14, the invention is not to be restricted in certain of its aspects to the use of such endless member since wire or the like could be unwound from a reel, passed through the latex, the collective latex could be stripped from said wire, and the wire could then be rewound upon a second reel.

I claim:—

1. A method of producing a rubber thread which comprises moving an endless belt member through a closed path, while causing said belt member to move through a body of rubber dispersion in a portion of said path, heating said belt member so that it collects the rubber dispersion by the adhesion thereof, stripping the collected rubber from said belt member after said collected rubber has become sufficiently coherent, and then additionally heating the stripped rubber so as to vulcanize the same, while continuously shaping the stripped rubber during the stripping and prior to the complete vulcanization thereof.

2. An apparatus for producing a rubber thread comprising an endless belt member, means for actuating said belt member through a closed path, a body of a rubber dispersion, said body being located so that said belt member passes through said body in a portion of the path of movement of said belt member, said path being partially below and partially above the top of said body and wholly above the bottom of said body so that a bight of said belt member dips into said body wholly above the top thereof, means for heating the entering run of said belt member, means for heating the outlet run of said belt member and the rubber which has been collected thereon, and means for stripping the collected rubber from said outlet run.

3. An apparatus for producing a rubber thread comprising an endless belt member, means for actuating said belt member through a closed path, a body of a rubber dispersion, said body being located so that said belt member passes through said body in a portion of its path of movement, said path being partially below and partially above the top of said body and wholly above the bottom of said body so that a bight of said belt member dips into said body wholly above the top thereof, means for heating the entering run of said belt member, means for heating the outlet run of said belt member and the rubber which has been collected thereon, and means for stripping the collected rubber from said outlet run, heating means for additionally heating the stripped rubber, means for winding up the rubber thread, said heating means being located intermediate said outlet run and said winding-up means.

4. In an apparatus for producing a rubber thread, a bendable collecting member, means for moving said member and for causing said member to contact with a rubber dispersion, and heating means for heating said member so that the portion thereof which contacts with the rubber dispersion is sufficiently hot to collect the rubber dispersion by surface adhesion, said heating means including a heating coil through which said collecting member passes.

5. A method of producing a rubber thread, which comprises passing a heated and bendable member through a body of rubber dispersion, while preventing contact between said rubber dispersion and a longitudinal zone of said collecting member, collecting the rubber dispersion only upon the exposed zone of said collecting member, and stripping the collected rubber from said member so as to form a rubber member having a longitudinal recess which corresponds to said first-mentioned longitudinal zone, said rubber member having sufficient body and being sufficiently thin so that it can be covered directly with thread.

6. A process of producing a rubber thread which comprises passing a filamentary member around and in contact with a rotatable member partly submerged in a body of latex, maintaining said filamentary member and body of latex at different temperatures with the filamentary member at the higher temperature, whereby rubber is collected on the exposed surface of the filamentary member, and stripping the collected rubber from the filamentary member in the form of a continuous filament.

GEORGE D. KRATZ.